United States Patent [19]

Rogge

[11] 4,280,710
[45] Jul. 28, 1981

[54] THIRD AXLE ATTACHMENT FOR MOTOR VEHICLES

[76] Inventor: Gail E. Rogge, 41750 Shady La., Hemet, Calif. 92343

[21] Appl. No.: 38,333

[22] Filed: May 11, 1979

[51] Int. Cl.³ .............................................. B60G 5/00
[52] U.S. Cl. ............................... 280/81 R; 280/680; 280/767
[58] Field of Search ............... 280/81 R, 680, 686, 280/704, 767

[56] References Cited

U.S. PATENT DOCUMENTS

| | | | |
|---|---|---|---|
| 1,881,070 | 10/1932 | Falk | 280/686 |
| 3,120,395 | 2/1964 | Fite | 280/680 |

Primary Examiner—Randolph A. Reese
Assistant Examiner—John A. Carroll
Attorney, Agent, or Firm—Cullen, Sloman, Cantor, Grauer, Scott & Rutherford

[57] ABSTRACT

A third axle is provided with auxiliary wheel mounts at opposite ends. Auxiliary cantilever leaf springs are fixed at their rear ends to the third axle and are pivotally connected at their forward ends to anchor plates which are mountable on the main rear axle, using the existing or similar U-shaped bolts normally used to attach the rear chassis frame support springs to the rear axle. Load transferring brackets secured to the chassis frame rest against the auxiliary springs intermediate their ends to transfer a predetermined portion of the load to the auxiliary wheels under all load conditions. The brackets are clamped to the chassis frame by bolts which bear against the top and bottom surfaces of portions of the frame to eliminate drilling, welding or otherwise modifying the frame.

6 Claims, 11 Drawing Figures

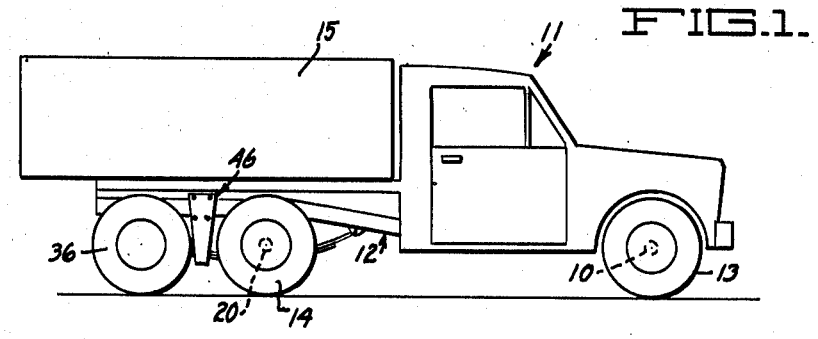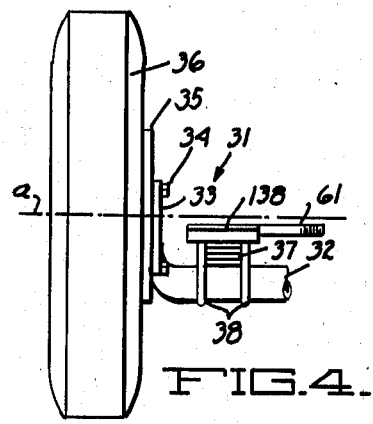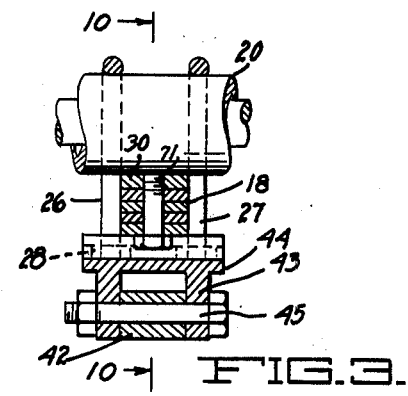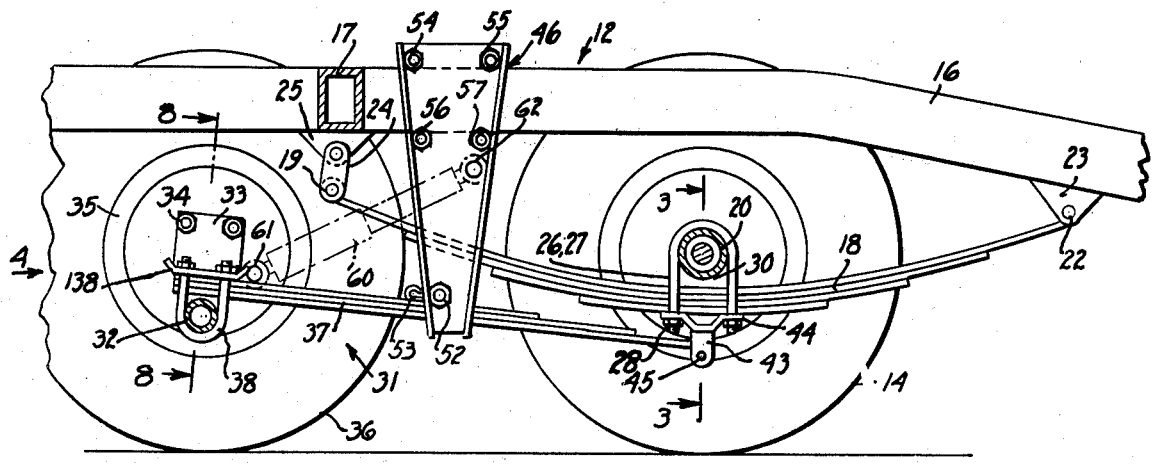

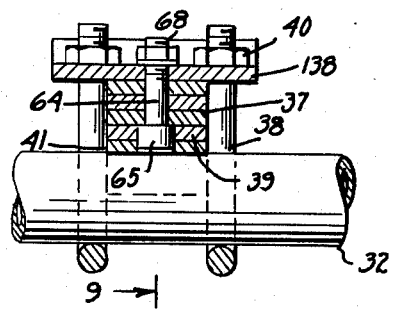
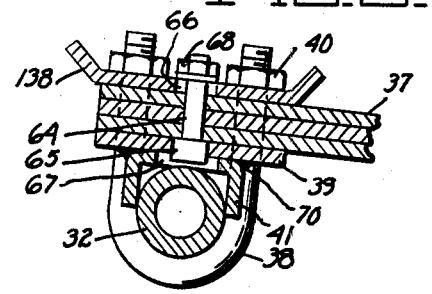
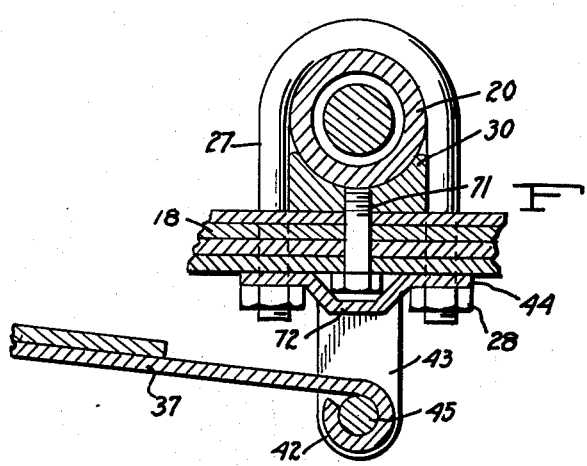
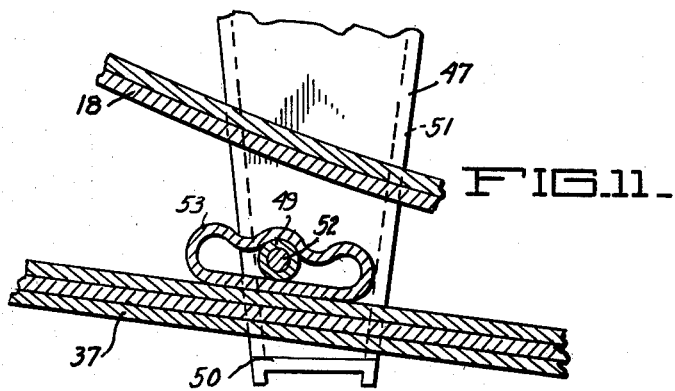

THIRD AXLE ATTACHMENT FOR MOTOR VEHICLES

BACKGROUND OF THE INVENTION

1. Field of the Invention

This invention relates to a vehicle suspension system and has particular reference to a third axle attachment for an existing motor vehicle, such as a truck, automobile or the like.

2. Description of the Prior Art

Although motor vehicles are designed to carry a predetermined maximum load, such load is often exceeded. Also, even if a load is within design specifications, it may be located with its center of gravity offset from its optimum position, resulting in overloading of the rear wheels, axle, springs, etc. This not only increases wear and tendency for breakdown of such parts but also can induce dangerous sagging, swaying and bouncing of the vehicle when traversing rough terrain or around curves and corners.

Auxiliary or third axle wheel support devices have been used heretofore, employing additional wheels arranged in tandem with the rear drive wheels of the vehicle to assist in supporting excessive loads. However, those wheel supports of which I am aware are quite expensive and complicated. Also, they generally require extension of the standard chassis frame and/or other modification of the existing vehicle structure such as by drilling holes, welding, etc. Further, such prior devices generally increase the stiffness of the overall spring suspension system throughout its range of deflection thereby resulting in a rough or stiff riding condition when the vehicle is driven with a light load or no load at all. Additionally, such prior devices generally tend to impose a fixed load carrying a capability on the auxiliary wheels so that the amount of load borne by the rear drive wheels may vary as they encounter dips or bumps in the road with consequent tendency to lose traction at times when a greater percent of the load is borne by the auxiliary wheels.

SUMMARY OF THE INVENTION

It therefore becomes a principal object of the present invention to provide a third axle attachment for a motor vehicle in which the percentage of distribution of load between the main rear wheels of the vehicle and the wheels of the third axle remains substantially constant throughout different load conditions.

Another object is to provide a third axle attachment which may be easily and quickly attached to a motor vehicle without having to modify the vehicle.

Another object is to provide a third axle attachment which will provide soft ride characteristics, with no bouncing tendency, even when the vehicle is carrying no or little load.

Another object is to provide an auxiliary wheel support which is inexpensive to manufacture and assemble.

According to the invention, a third axle attachment is provided which can be readily mounted on or demounted from a vehicle without having to modify the latter.

The axle attachment comprises auxiliary cantilever leaf springs arranged to be pivotally connected at their forward ends to anchor means which mount the rear vehicle springs to the main rear vehicle axis. The rear ends of the auxiliary springs are rigidly attached to the third axle having wheel mounts for auxiliary wheels at opposite ends. The auxiliary springs pivotally support the vehicle chassis frame, intermediate their ends, through brackets which are clamped at their upper ends to portions of the chassis frame. The auxiliary springs act as yieldable pivoted beams connected between the main axle and the third axle. Accordingly, as the load increases, an increasing portion of the load is carried by the third axle and the distribution of the load is substantially constant throughout different load conditions and as the vehicle wheels move over dips and bumps in the road.

BRIEF DESCRIPTION OF THE DRAWINGS

The manner in which the above and other objects of the invention are accomplished will be readily understood on reference to the following specification when read in conjunction with the accompanying drawings, wherein:

FIG. 1 is a side view of a motor driven truck embodying a preferred form of the present invention.

FIG. 2 is a longitudinal sectional view through the rear portion of the truck with the third axle device mounted thereon.

FIG. 3 is an enlarged transverse sectional view taken along the line 3—3 of FIG. 2.

FIG. 4 is a front view of part of the third axle device and is taken in the direction of the arrow 4 of FIG. 2.

FIG. 8 is an enlarged fragmentary sectional view taken along the line 8—8 of FIG. 2.

FIG. 9 is a sectional view taken along line 9—9 of FIG. 8.

FIG. 10 is an enlarged sectional view taken along line 10—10 of FIG. 3.

FIG. 11 is an enlarged sectional view taken along line 11—11 of FIG. 7.

DESCRIPTION OF THE PREFERRED EMBODIMENT

Figure 5:
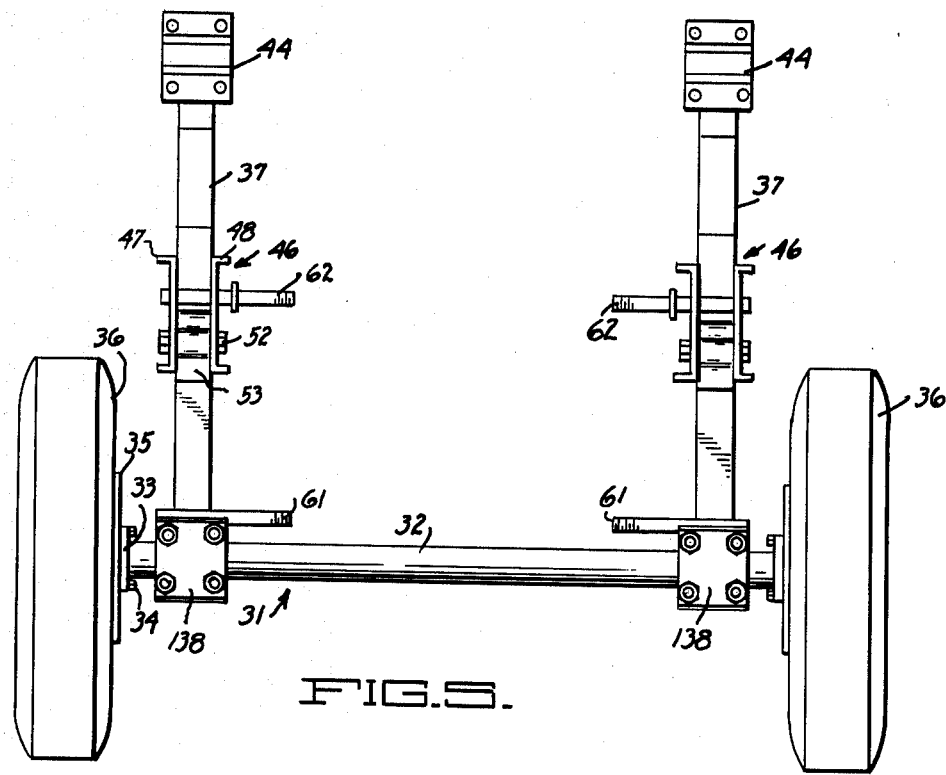
FIG. 5 is a top plan view of the third axle device removed from the vehicle.
Figures 6, 7:
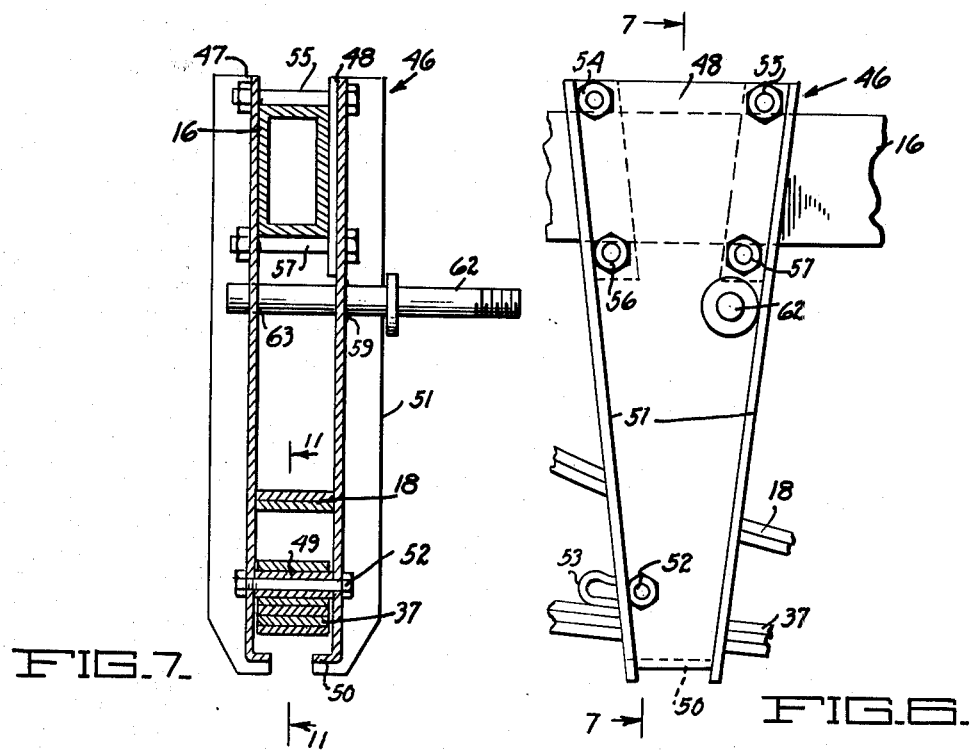
FIG. 6 is an enlarged side view of a pair of the spring bracket plates.
FIG. 7 is a sectional view taken substantially along the line 7—7 of FIG. 6.

Although this invention is susceptible to embodiment in many different forms, there is shown in the drawings and will be described in detail one specific embodiment, with the understanding that the present disclosure is to be considered as an exemplification of the principles of the invention and is not intended to limit the invention to the embodiment illustrated.

Referring to the drawings, FIG. 1 illustrates a typical motor driven truck generally indicated at 11. The body of the truck is suitably supported on a chassis frame 12 which, in turn, is supported by front wheels 13 mounted on a front axle 10 and rear drive wheels 14 mounted on a rear axle 20. As illustrated, a load 15 may extend rearwardly beyond the truck, giving rise to a normally overloaded condition, even if the amount of the load is within the designed load carrying capacity.

As shown in FIG. 2, the chassis frmae 12 typically comprises laterally spaced longitudinally extending frame members, one of which is shown at 16, having cross frame members, one of which is shown at 17, integrally connected between the members 16. Stacked semi-elliptical leaf springs 18 resiliently support the chassis frame 12 from the rear axle 20. The upper one of the leaf springs 18 is pivoted at its forward end at 22 to a hanger bracket 23 depending from the aligned frame member 16, and is pivoted at 19 at its rear end to a shackle 24 which, in turn, is pivoted to a hanger bracket 25 depending from the frame member 16. Also, typically, the main leaf springs 18 are mounted to the axle 20 by means of a pair of spaced U-shaped bolts 26 and 27 (see also FIGS. 3 and 10) which are fitted over the rear axle 20 on opposite sides of the leaf springs 18. Nuts 28 clamp a suitable plate (not shown) against the leaf springs and against a pad member 30 interposed between the axle 20 and the leaf springs.

According to the present invention, a third axle assembly, generally indicated at 31, FIGS. 2 and 5, is provided, comprising a rigid tubular axle 32 terminating at its ends in upstanding bracket plates 33 which are secured by bolts 34 to wheel mounts 35 on which auxiliary support wheels 36 are rotatably mounted. It will be noted in FIGS. 2 and 4 that the axle 32 is offset vertically below the axis "a" of each of the wheels 36.

Two sets 37 of stacked leaf springs are rigidly attached at their rear or trailing ends to the axle 32 and for this purpose, a pair of U-shaped bolts 38 (see also FIGS. 8 and 9) are fitted under the axle of each side of each set of leaf springs 37. The bolts extend through an anchor plate 138 and are provided with nuts 40 to tightly clamp the anchor plate against the springs 37 and against a second plate 39 and a channel shaped pad 41 resting against the axle, thereby forming a rigid mounting for the springs on the axle.

In order to facilitate assembly and initial adjustment of the springs 37 to insure that the axle 32 is parallel to the main rear axle 20, a bolt 64 having a head 65 thereon, is passed through holes in the springs 37 and through an elongate slot 66 in the plate 138. The head 65 is fitted within a hole in the plate 39 and within an elongate slot 67 in the pad 41. Thus, the springs 37 may be adjusted endwise as a unit a limited amount relative to the axle and thereafter a nut 68 is tightened on bolt 64 to clamp the springs in place. Subsequently, the nuts 40 are tightened to clamp the springs 37 rigidly to the axle 32. If desired, the plate 39 may be welded to the pad 41 at 70 to prevent subsequent relative movement between the springs 37 and axle 32.

The stacked leaf springs 37 are of different lengths and the longest and undermost spring is formed with a spring eye 42 (see also FIGS. 3 and 10) at its forward or leading end which is fitted between spaced depending lugs 43 integrally formed on an anchor plate 44. A pivot bolt 45 extends through the eye and lugs 43.

In mounting the third axle assembly 31 to the truck, the aforementioned anchor plate (not shown), normally retained by the bolts 26 and 27, is removed and is replaced by the anchor plate 44 which is clamped against the underside of the main leaf springs 18 by buts 28, this providing a pivotal support for the auxiliary springs 37 directly in line with the point of support of the main springs 18 on the axle 20.

In the illustrated embodiment, a bolt 71 is passed through holes in the stacked springs 18 and is threaded into the pad 30 to initially hold the springs 18 in place. For this reason, the plate 44 is formed with a channel section 72 to clear the head of bolt 71.

Spring saddles or bracket devices generally indicated at 46, FIGS. 1, 2, 5, 6, 7 and 11 are provided to form pivotal supports which normally rest against the auxiliary springs 37 to transfer a portion of the load from the chassis frame 12 to the auxiliary wheels 36. Each bracket device comprises a pair of bracket plates 47 and 48 which straddle the respective frame member 16, the main leaf springs 18 and the auxiliary springs 37. Both plates 47 and 48 have inwardly bent lower ends 50 which underly the springs 37, and outwardly extending stiffener flanges 51.

A bolt 52 extends through the plates 47 an 48 to clamp the plates against the ends of a bushing 49 fitted over the bolt. The bushing passes through a flexure control member 53 which is free to pivot on the bushing. The member 53 is rigid and rounded at opposite ends and normally engages the uppermost leaf spring 37 for the purpose of causing the springs 37, when flexed, to flex over a larger radius than would be the case if they directly engaged the bolt 52, thereby reducing any tendency for such springs to break.

It will be noted that the inturned lower ends 50 of the bracket plates 47 and 48 are spaced slightly below the lowermost leaf spring 37 to permit flexing and pivoting of the springs as well as endwise sliding movement relative to the brackets 46, without interference.

The bracket plates permit flexing and sliding movement of the main springs 18 therebetween and thus aid in guiding both sets of springs 18 and 37 against lateral movement while permitting endwise sliding movement between the springs and plates 47 and 48.

Aligned holes are formed in the upper ends of the bracket plates 47 and 48 to permit clamp bolts 54, 55, 56 and 57 to be passed therethrough to clamp the plates tightly against opposite sides of the respective frame member 16. The bolts 54 and 55 are engageable with the upper surface of the member 16 and bolts 56 and 57 are engageable with the lower surface of the member to thus rigidly secure the bracket 46 in place and to support loads transmitted between the frame and the bracket without having to drill or weld the member 16.

Accordingly, in order to mount the auxiliary support device 31 on the truck, the spring bracket plates 47, 48 are merely slipped over the opposite sides of the respective main springs 18 and frame members 16 and are clamped in position by the bolts 54 to 57. The anchor plates 44 are then mounted by bolts 26 and 27, as aforesaid.

The amount of load support exerted by the auxiliary support device 31 can be adjusted somewhat by adjusting the position of the spring brackets 46 along the lengths of the springs 37. However, this adjustment is preferably such that the auxiliary wheels 36 will always support approximately 30% to 50% of the load supported by the main rear wheels 14 so that the rear wheels will retain adequate traction over the ground surface under all driving and road conditions.

It will be seen that the above noted percentage distribution of the load between the main drive wheels 14 and the auxiliary wheels 36 is substantially the same for different loads. Also, since the cantilever springs 37 are pivotally connected at their forward ends to the main axle and pivotally support the chassis frame 12 intermediate their ends, the same percentage of load distribution exists when the drive wheels 14 encounter dips or bumps in the road which may cause the same to move vertically relative to the auxiliary wheels 36. Therefore, the drive wheels 14 will maintain adequate driving traction under all load and road conditions. Also, because of such substantially constant load distribution, the truck passengers will not experience the hard riding characteristics usually found in trucks having third axle attachments, particularly when the load is decreased or entirely removed.

Telescoping shock absorbers, indicated by dotted lines 60, FIG. 2, may be provided to reduce vertical vibration of the third axle assembly. For this purpose, a stud 61 is welded to each anchor plate 138 and a second stud 62 is welded at 59 to each bracket plate 48. The latter stud extends through a bearing hole 63 in the opposite bracket plate 47. The shock absorbers 60, which may be of conventional construction, may be fitted over the studs 61 and 62 to snub any vertical vibrations of the wheels 36 resulting from travel at high speeds over uneven ground surfaces.

Although the wheels 36 are shown as being of the same diameter as the rear driving wheels 14, they may be made smaller, if desired, to clear any structure of the vehicle.

From the foregoing it will be observed that numerous variations and modifications may be effected without departing from the true spirit and scope of the novel concept of the invention. For example, according to a broader aspect of the invention, rigid cantilever beams (not shown) may be substituted for the cantilever springs 37, each beam being attached at one end to the axle 32 and pivoted at its opposite end to respective lugs 43.

I claim:

1. A third axle attachment for a motor vehicle having a chassis frame, a rear wheel axle, a pair of laterally spaced main leaf spring devices for supporting said frame from said rear axle, and means for attaching said main spring devices to said rear axle, comprising:
   a pair of laterally spaced auxiliary spring devices,
   each of said auxiliary spring devices comprising stacked auxiliary leaf springs of progressively greater length,
   means for pivotally connecting the said auxiliary leaf springs of greatest length at their forward ends of said attaching means for vertical movement therewith,
   a rigid third axle for auxiliary support wheels,
   means for rigidly attaching all of said auxiliary leaf springs at their rear ends to said axle for vertical movement therewith,
   a pair of brackets,
   each of said brackets comprising a pair of bracket plates,
   said plates straddling a respective said main spring device, a respective said auxiliary spring device and a respective portion of said frame;
   upper bolts extending through said plates and engaging the upper surface of said respective frame portion,
   lower bolts extending through said plates and engaging the upper surface of said respective frame portion,
   lower bolts extending through said plates and engaging the lower surface of said respective frame portion whereby to prevent relative movement between said brackets and said frame, and
   means on said brackets for transferring a load from said frame to said auxiliary spring devices intermediate the ends of said auxiliary spring devices.

2. A third axle attachment for a vehicle having a chassis frame, a rear axle, spring means for supporting said frame from said rear axle, and spring mounting means for attaching said spring means to said rear axle, comprising:
   an auxiliary leaf spring having mounted means at its forward end for pivotal connection to said rear axle for vertical movement therewith and further mounting means at its rearward end for connection to the axle of a third axle attachment for vertical movement therewith;
   load transferring means having mounting means for attachment to said chassis frame for transferring a portion of the load from said frame to said auxiliary leaf spring at a location intermediate the ends of said auxiliary leaf spring;
   the geometry and loading of said third axle attachment being selected to normally maintain the wheels of the third axle in contact with the ground during all static load conditions.

3. The attachment of claim 2 wherein said load transferring means abuts the uppermost surface of said auxiliary spring for normally transmitting downward loads from said chassis frame through said auxiliary leaf spring to said third axle and said rear axle, while permitting longitudinal movement of said auxiliary spring relative to said load transferring means.

4. The attachment of claim 2 wherein said load transferring means is secured to said chassis frame by clamping means which abut the upper and lower surfaces of the chassis frame, thereby transmitting upward and downward forces between said chassis frame and said attachment without the need for any modification of said chassis frame.

5. The attachment of claim 2 wherein said auxiliary leaf spring comprises a plurality of stacked leaf springs of progressively greater length, the longest of said leaf springs being pivotally connected at said forward end to said rear axle, and all of said leaf springs being rigidly attached at said rearward end to said third axle.

6. The attachment of claim 3 wherein said load transferring means comprises a pair of laterally spaced bracket plates straddling said chassis frame and said spring means and said auxiliary leaf spring, said bracket plates permitting longitudinal movement of said spring means relative thereto, said bracket plates having means for limiting downward movement of said auxiliary leaf spring relative thereto, upper bolts extending through said bracket plates and engaging the upper surface of said chassis frame, and lower bolts exending through said bracket plates and engaging the lower surface of said chassis frame to removably secure said bracket plates to said chassis frame without modification of said chassis frame.

* * * * *

UNITED STATES PATENT OFFICE
CERTIFICATE OF CORRECTION

Patent No. 4,280,710  Dated  July 28, 1981

Inventor(s) Gail E. Rogge

It is certified that error appears in the above-identified patent and that said Letters Patent are hereby corrected as shown below:

Column 6, line 11, "mounted" should read — mounting —.

Signed and Sealed this

Third Day of May 1983

[SEAL]

Attest:

GERALD J. MOSSINGHOFF

Attesting Officer  Commissioner of Patents and Trademarks